Nov. 9, 1971 C. W. CLARK 3,618,505
AUTOMATIC PHOTOGRAPHIC APPARATUS
Filed Nov. 20, 1968 7 Sheets-Sheet 1

FIG.1.

INVENTOR
CHARLES WILLIAM CLARK
BY
Watson, Cole, Grindle & Watson
ATTORNEYS

Nov. 9, 1971  C. W. CLARK  3,618,505
AUTOMATIC PHOTOGRAPHIC APPARATUS

Filed Nov. 20, 1968  7 Sheets-Sheet 2

INVENTOR
CHARLES WILLIAM CLARK
BY
ATTORNEYS

FIG.5.

Nov. 9, 1971          C. W. CLARK           3,618,505
AUTOMATIC PHOTOGRAPHIC APPARATUS
Filed Nov. 20, 1968                    7 Sheets-Sheet 5

INVENTOR
CHARLES WILLIAM CLARK
BY
ATTORNEYS

FIG. 9.

INVENTOR
CHARLES WILLIAM CLARK
BY
ATTORNEYS

United States Patent Office 3,618,505
Patented Nov. 9, 1971

3,618,505
AUTOMATIC PHOTOGRAPHIC APPARATUS
Charles W. Clark, Maidenhead, Berkshire, England
Filed Nov. 20, 1968, Ser. No. 777,323
Claims priority, application Great Britain, Nov. 20, 1967,
52,751/67
Int. Cl. G03d 3/10
U.S. Cl. 95—89 D            3 Claims

ABSTRACT OF THE DISCLOSURE

Automatic development apparatus for dipping a sheet of exposed photo-sensitive sheet material successively into liquids contained in a number of process tanks. The sheet is contained in a carrier which is attached to conveyor means such as a chain which imparts to the carrier a movement such that as the carrier is withdrawn from the process tanks it is drawn up the wall of the tank and over the edge of the tank to wipe excess liquid from the carrier.

CROSS REFERENCES

The invention is particularly applicable to the chain conveyor means described and claimed in my-copending application Ser. No. 777,324, filed simultaneously with this application and entitled "Photographic Apparatus."

BACKGROUND OF THE INVENTION

This invention relates to automatic photographic development apparatus of the kind having a carrier for an exposed photo-sensitive sheet, a number of process tanks, and conveyor means arranged to dip the carrier successively into the process tanks. One form of apparatus of this kind is shown in British patent specification No. 780,707. A factor which is always present with such apparatus is that as the carrier is raised from a process tank some of the process liquid from the tank clings to the carrier as well as to the sheet contained in the carrier and this liquid is removed from the process tank and carried over into the next tank. It is usual to alternate tanks containing different process liquids with tanks containing water so that after the carrier and photo-sensitive sheet have been dipped in a process liquid they are next dipped in water before being dipped in another process liquid. This reduces the pollution of the later tanks by material carried over from the earlier tanks. Nevertheless, some pollution occurs and dilution of the material in the tanks takes place.

SUMMARY OF THE INVENTION

It is an object of the present invention to reduce the amount of liquid carried over on the carriers and according to the present invention the conveyor means is so arranged that on withdrawal of the carrier from each tank the carrier contacts the tank to wipe liquid from the carrier. Thus instead of the carrier being lifted clear before it is transferred to the next tank so that the carrier does not in fact contact the tanks as has been the practice hitherto, the carrier is wiped on the tank so that surface liquid is wiped off the carrier and returned to the tank. It is possible to arrange for part of the travel of the carrier to be substantially parallel with and in contact with the side wall of the tank so that a wiping action along one side of the carrier takes place. However, whether or not there is such wiping along the side wall of the tank, preferably the carrier is drawn over the edge of the tank so that the upper edge of the tank wipes at least the bottom of the carrier to remove drips of process liquid adhering to the bottom edges of the carrier.

The invention may be applied to carriers of various constructions including the sheet metal carriers which have commonly been employed hitherto in this kind of apparatus. Likewise, the invention may be applied, with suitable adaptation, to various forms of conveyor means including the rotary kind of conveyor means in which the tanks are arranged side by side in a circle and the carriers hold the sheets in vertical planes and are transferred by means of a rotary conveying means mounted in the centre of the circle as described in British patent specification No. 780,707 referred to above. However, the invention is particularly applicable to the chain conveyor means described and claimed in my co-pending patent application referred to above.

DESCRIPTION OF THE DRAWINGS

The invention may be carried into practice in various ways but one form of automatic photographic kiosk incorporating automatic development apparatus in accordance with the invention will now be described by way of example with reference to the accompanying drawings which show in detail only those parts of the equipment which are important to an understanding of the invention. In the drawings.

DESCRIPTION OF THE PREFERRED EMBODIMENT

Figure 1:
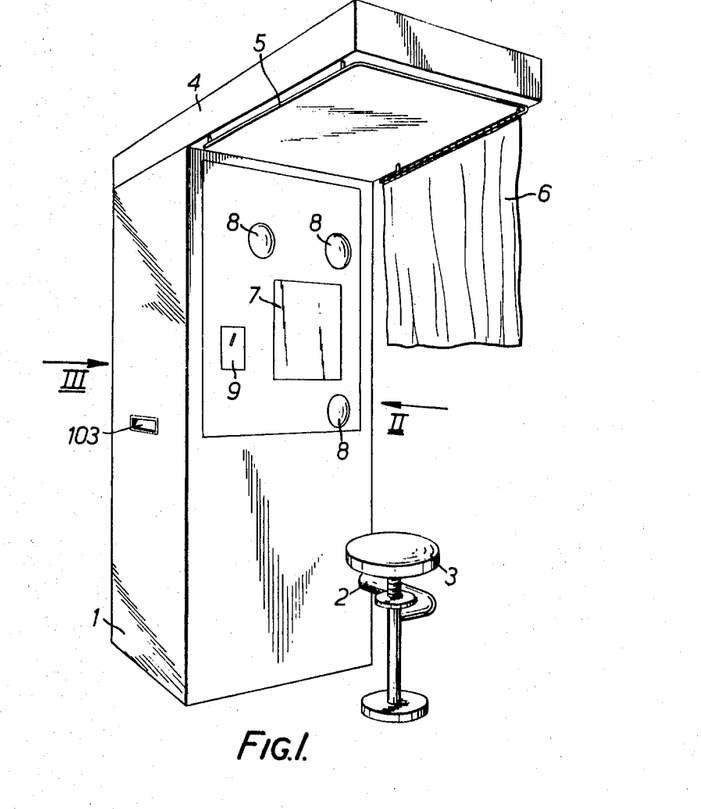
FIG. 1 is a perspective view of the automatic photographic kiosk having a housing containing the apparatus shown in the remaining figures of the drawings.

FIG. 1 shows a coin-operated photographic kiosk which consists of a main housing or free-standing cupboard 1 from which projects an arm 2 on which is fixed a seat 3 on which the subject to be photographed sits. The housing 1 supports a horizontal cover or roof portion 4 which has a cantilevered section on the underside of which there is a curtain rail 5 supporting a short curtain 6 which may be drawn round to conceal the head and shoulders of the person being photographed. In the wall of the housing 1 facing the subject there is a window 7 through which a camera contained within the housing may face the subject and there are three flash lamps 8 to illuminate the sitter. There is a slot 9 to receive a coin by which the subject sets the apparatus in operation.

Figure 2:
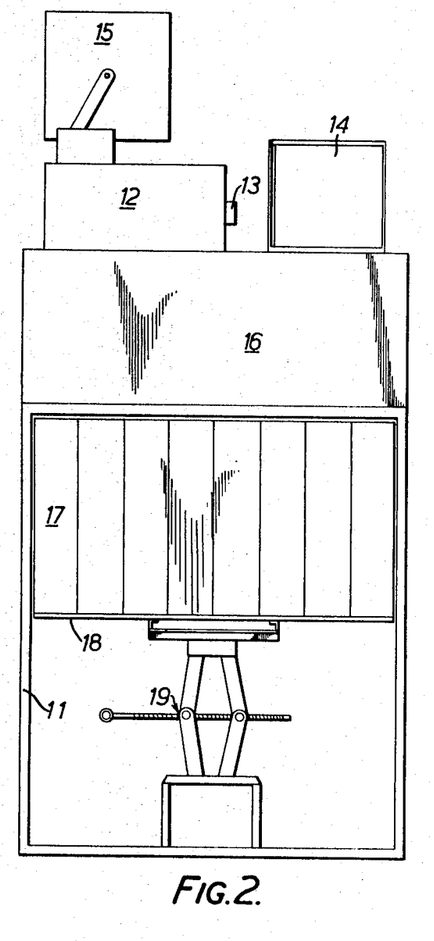
FIG. 2 is an elevation in the direction of the arrow II in FIG. 1 of the automatic development apparatus.
Figure 3:
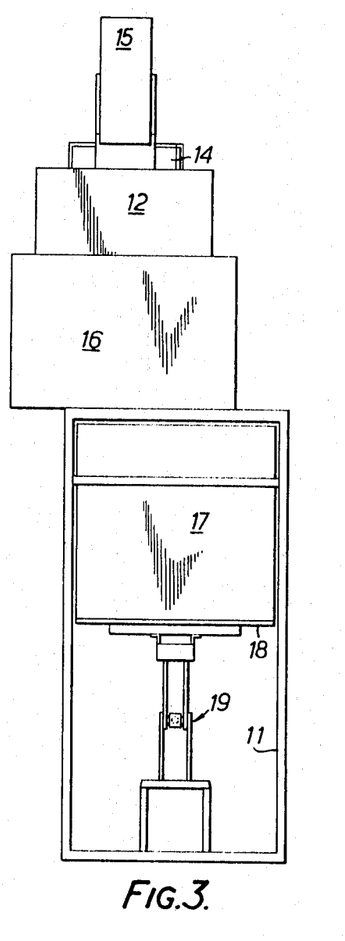
FIG. 3 is a side elevation in the direction of the arrow III in FIG. 1 of the apparatus shown in FIG. 2.

The photographic equipment within the housing 1 shown in FIG. 1 is shown generally in FIGS. 2 and 3, FIG. 2 being the elevation which would be viewed by a subject on the seat 3 if the adjacent wall of the housing 1 was removed. The apparatus includes a framework 11 which supports a camera 12 the lens 13 of which faces to the right in FIG. 2 towards a vertical mirror 14 which is at 45° to the camera axis so that a subject will be viewed by the camera via the mirror 14 and the window 7. The camera is of the kind which operates with reversal film in strip form contained in a magazine 15 supported above the camera. Below the camera is a development and fixing apparatus 16 arranged to dip an exposed length of film cut from the strip successively into liquids contained in a series of tanks 17 which are supported on a platform 18 which may be elevated or lowered by a toggle-type screw jack 19.

When a person places a coin in the slot 9 a length of film is fed from the magazine 14 into the camera 12 and is there exposed, the lights 8 flashing at the appropriate time. The exposed film is then fed down automatically and is cut off. The exposed film now in the form of a severed sheet is fed into the development and fixing apparatus 16 which is shown in greater detail in subsequent figures and particularly FIGS. 4 and 5. The development apparatus consists essentially of an infeed and outfeed unit 21, a conveyor unit 22 and the tank unit 17 already referred to.

Figure 4:
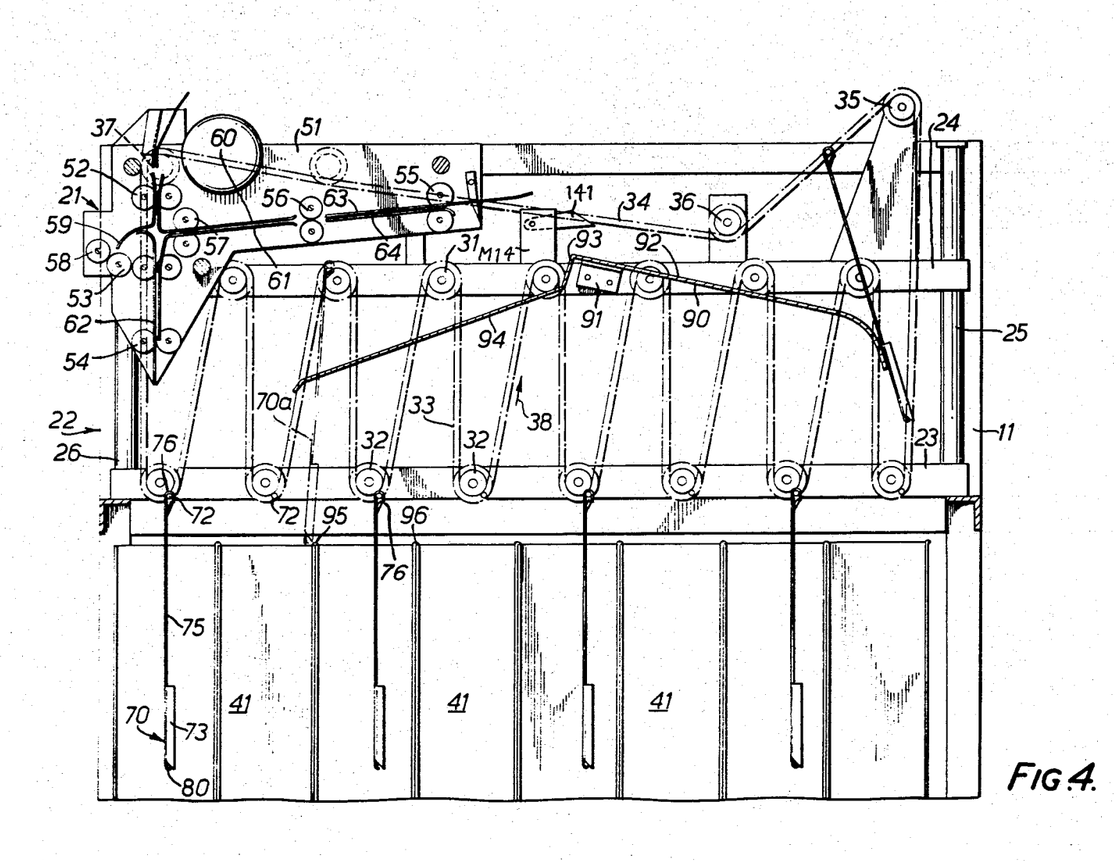
FIG. 4 is a central vertical section of the development apparatus.

The conveyor unit 22 consists of two spaced parallel rectangular frames each of which comprises a lower horizontal member 23, an upper horizontal member 24 and columns 25 and 26. The two rectangular frames are mounted on the framework to leave a clear space between them. Each of the frames carries a row of upper sprockets 31 and a row of lower sprockets 32 and an endless chain 33 is trained over the sprockets in zig-zag or sinuous fashion. The chains are roller chains and are preferably made of a plastics material which is resistant to chemical action. The chain passes from one end of the zig-zag to the other along an upper pass 34 to a second upper sprocket 35, past an idler sprocket 36 to a second upper sprocket 37. The chains can be driven in the direction indicated by the arrow 38 by an electric motor 39 which drives certain of the lower sprockets 32 via a gearbox 40 and a chain drive.

Figure 5:
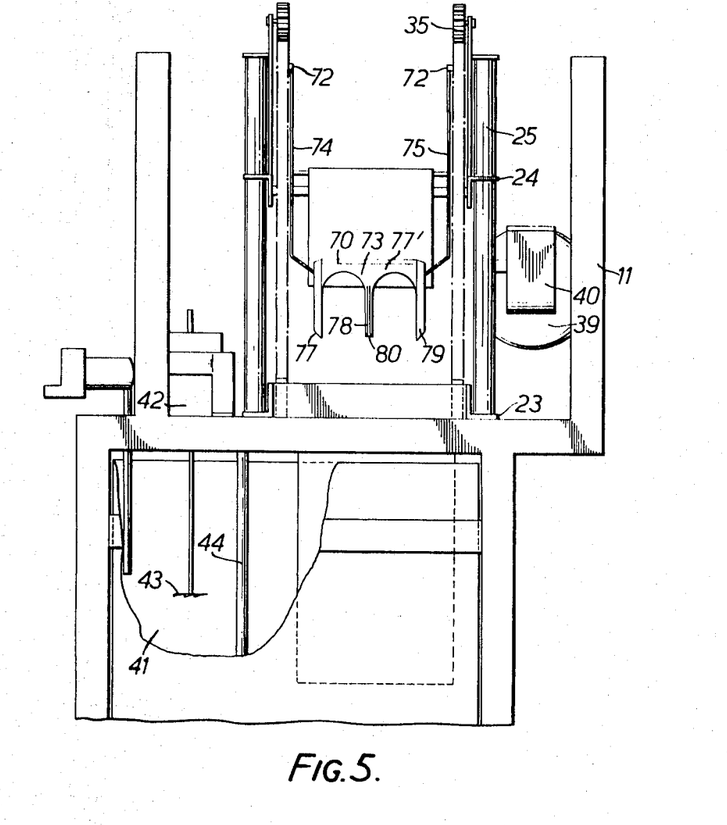
FIG. 5 is an end elevation of the apparatus shown in FIG. 4 taken from the right hand end.
Figure 6:
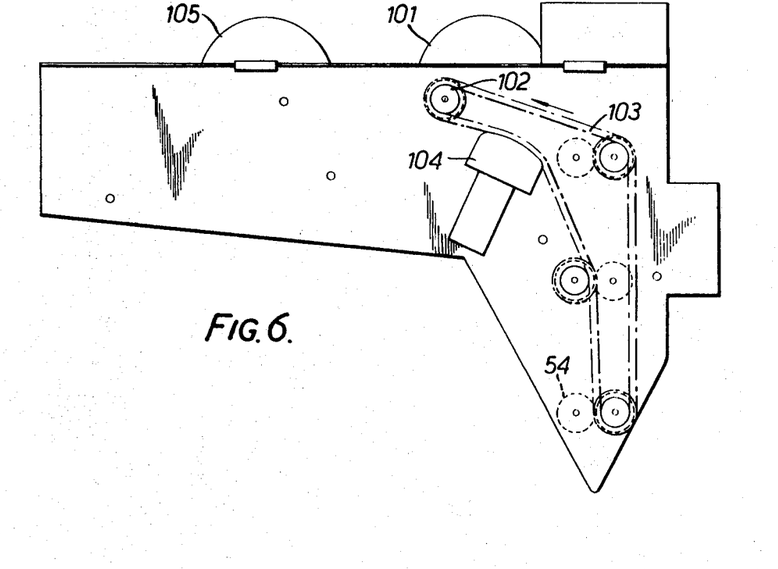
FIG. 6 is aside elevation of the infeed-outfeed unit shown in FIG. 4 taken from the opposite side to FIG. 4 and to a larger scale.

Immediately below the frame there is the tank unit 17 which comprises a row of ten rectangular open-topped contiguous tanks 41 alternate ones of which hold processing liquids and the remainder of which hold water. The liquids are used for developing and fixing the image on the photosensitive sheet. As can be seen in FIG. 5 the tanks 41 are wider than the conveyor and the frame supports a number of electric motors 42 which drive paddles 43 which dip into the tanks when the tanks are in their elevated positions. The frame also supports a number of electric immersion heaters 44 which likewise dip into the tanks when the tanks are elevated. When the screw jack 19 (FIG. 2) is unwound to lower the tank unit 17, the upper edges of the tanks drop below the level of the heaters and the paddles 43 so that the tanks can be removed laterally without interfering with the heaters and the paddles.

Mounted on the upper horizontal frame members and depending into the space between the two conveyors are two side plates 51 one of which can be seen in FIG. 4 and which forms the basic structure of the infeed and outfeed unit 21. This unit is not shown in FIG. 5. Spanning between the plates 51 there are seven pairs of rollers. For infeed there are three pairs 52, 53 and 54 while for outfeed there are four pairs of rollers 55, 56, 57 and 58. The infeed and outfeed also comprise narrow sheet metal fixed guides 59, 60, 61, 62, 63 and 64.

The conveyor carries a plurality of sheet metal carriers 70 only four of which are shown in FIG. 4 of which there is a total of eight or sixteen. The carriers are suspended in pendulum fashion from studs 72 which project inwardly from the conveyors. Each carrier is formed from a bent sheet of stainless steel 73 and two carrier arms 74 and 75 of bent square-section stainless steel wire having hooks 76 at their upper ends to engage the studs 72. The sheet metal portion is formed with a flat yoke section 77' and three fingers 77, 78 and 79 depending therefrom. The two outer fingers 77 and 79 have their outer edges bent forwardly and inwardly to form open-ended vertical grooves which face one another while the bottom end of the inner finger 78 is bent inwardly and upwardly to form a hook 80.

Located between the conveyor chains 33 there is a drainer shield 90 which is attached to the horizontal members 24 by brackets 91. The shield has a first upwardly inclined portion 92, a step 93 and a second downwardly inclined portion 94.

The apparatus described operates as follows. With the conveyor in the position shown and stationary, the sitter inserts a coin into the slot 9. The camera is operated and a sheet of exposed photosensitive paper is fed down from the camera 12 into the development apparatus as described above. The sheet is received between the guides 59 and 60 and is fed by the rollers 52, 53 and 54 into a waiting carrier 70 which at this time will have the upper edges of its sheet metal portion immediately below the lower end of the guides 61 and 62. The sheet is fed so that its outer edges engage in the grooves formed in the fingers 77 and 79 of the carrier and its lower edge engages the hook 80 at the bottom of the inner finger 78. When the sheet is in position, the motor 39 is actuated to drive the conveyor forward a distance such that the carrier containing the photosensitive sheet is lowered until the studs carrying this carrier are close to the left hand lower sprocket 32 and the carrier is in the position shown at the left hand side of FIG. 4. The conveyor then stops and the carrier remains in this position for a short dwell period, during which the photosensitive sheet is contacted by the liquid in the left hand tank 41. After the appropriate dwell period, the conveyor moves on through a further step and the carrier is raised from the liquid and the next carrier is lowered into the liquid in the first tank. During the ensuing dwell period the carrier is held above the liquid in the first tank and allowed to drain. During the next step the carrier is transferred from the first tank and lowered into the second tank. This stepwise movement continues and the carrier passes successively through the tanks with a dwell period in each tank and a dwell period above each tank so that surplus liquid can drain into the tank.

The length of each carrier from hook 76 at the top to hook 80 at the bottom is approximately equal to the distance between the tops of the upper sprockets 31 and the upper edges 95 of the tanks 41. This is illustrated by the carrier 70a shown in chain-dotted lines in FIG. 4. The tanks are so located relative to the sprockets that as a carrier is raised from a tank it makes the last part of its movement in contact with and almost parallel with the side wall of the tank. This produces a wiping action wiping surplus liquid from the fingers 77 and 79. The period of dwell occurs in the position shown by the carrier 70a and almost all the liquid on the surface of the carrier and the photosensitive sheet will drain back into the tank. However, there will almost inevitably be drops at the bottom ends of the fingers of the carrier and these will not drain off under gravity. At the commencement of the next step, the studs supporting the carrier will move round the upper sprockets and will draw the lower end of the carrier over the edge 95 of the tanks and this wipes the last drops from the bottoms of the fingers.

As can be seen in FIG. 4 the upper edges of the right hand walls of the tanks 41 are formed with lips 96 which overlie the upper edges of the left hand walls of the next succeeding tanks so that liquid wiped off in the manner described drains back into the tank from which it has been withdrawn.

The photosensitive sheet in the carrier is successively lowered into and raised from each of the processing tanks 41 and finally arrives at the right hand end of the conveyor as viewed in FIG. 4. The upper ends of the carrier are then carried to the left along the upper path of the conveyor and the carrier itself engages the inclined portion 92 of the shield 90 and is tilted as the conveyor moves to the left so that the sheet lies at an angle to the horizontal with the photosensitive coating on the upper side. One carrier which has just begun to engage the shield 90 is shown in FIG. 4. During its passage along this guide the last traces of moisture drain from the photosensitive sheet. Its leading edge is then engaged between the rollers 55 of the feed out unit. The sheet is thus withdrawn from the carrier and is passed between the guides 63 and 64 and is advanced by the rollers 56, 57 and 58 and is discharged from the apparatus into a feed out slot 103 seen in FIG. 1 where it may be received by the person whose photograph has been taken. After the photosensitive sheet has been withdrawn from the carrier, the carrier leaves the upwardly inclined portion 92 of the shield 90, drops down the step 93 on to the downwardly inclined portion 94 and progressively returns to its initial position ready to receive a further photosensitive sheet.

The means by which the sequence of operations is performed will now be described in more detail with reference particularly to FIGS. 6 to 9.

The feed-in rollers 52, 53 and 54 are driven by a motor and gear box 101 through a drive sprocket 102 (FIG. 6) and a drive chain 103 which is tensioned by an adjustable guide 104. The feed-out rollers 55, 56, 57 and 58 are driven by a motor and gear box 105 through a sprocket 106 (FIG. 7) and a drive chain 107 which is tensioned by an adjustable guide 108. The conveyor chains 33 are driven by the motor 39 shown in FIG. 5 and in more detail in FIG. 8. The motor 39 drives the gear box 40 which drives a chain 110 which passes around sprockets 111, 112 and 113 on the same axles as three adjacent sprockets 32 of the lower row of sprockets over which the conveyor chain 33 is trained. The central sprocket 112 is free on its respective axle but the sprockets 111 and 113 are fixed to their axles so that the conveyor chain sprockets 32 are driven by the motor 39. Also fixed to the axle on which the sprocket 113 is fixed is another chain sprocket which drives a chain 114 which in turn drives a sprocket 115 which is fixed on another axle on which one of the lower conveyor chain sprockets 32 is fixed. Thus three of the sprockets 32 are driven by the motor 39.

Figure 8:
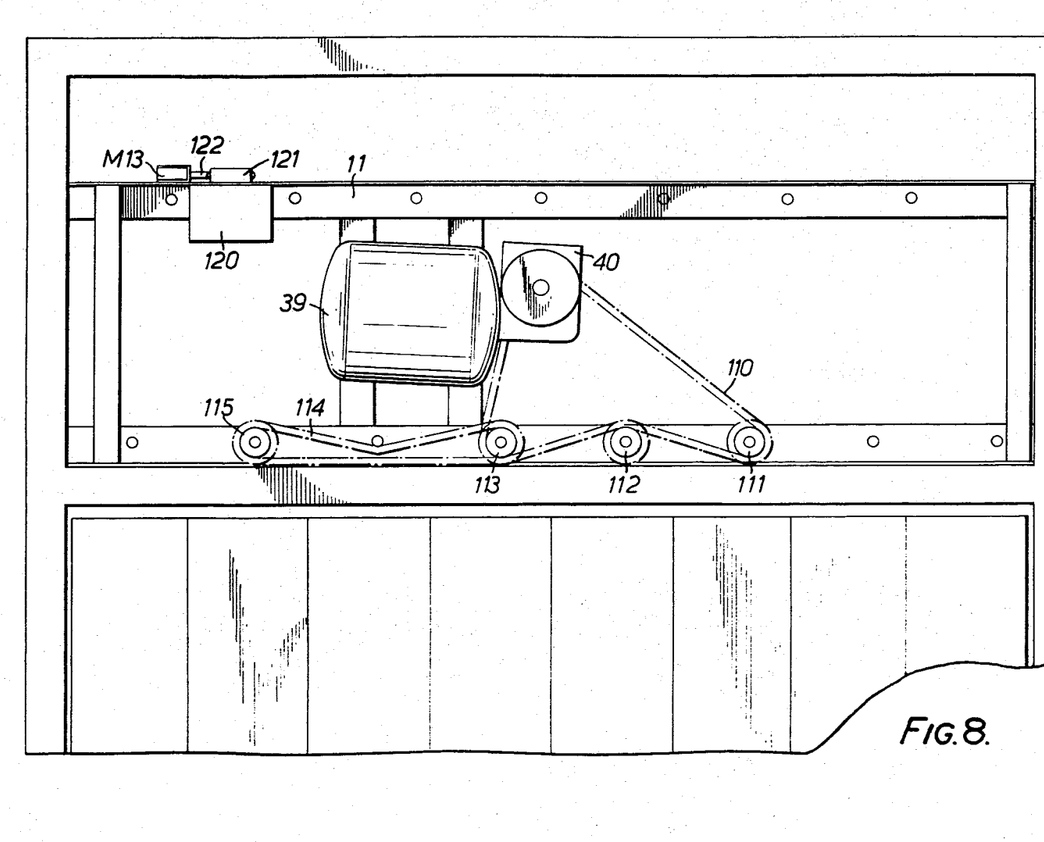
FIG. 8 is a simplified side elevation of the apparatus shown in FIG. 4.

As can be seen from FIG. 8, the frame 11 supports a cam motor 120 which drives a cam 121 the cam follower 122 of which is arranged to operate a microswitch M13.

Figure 7:
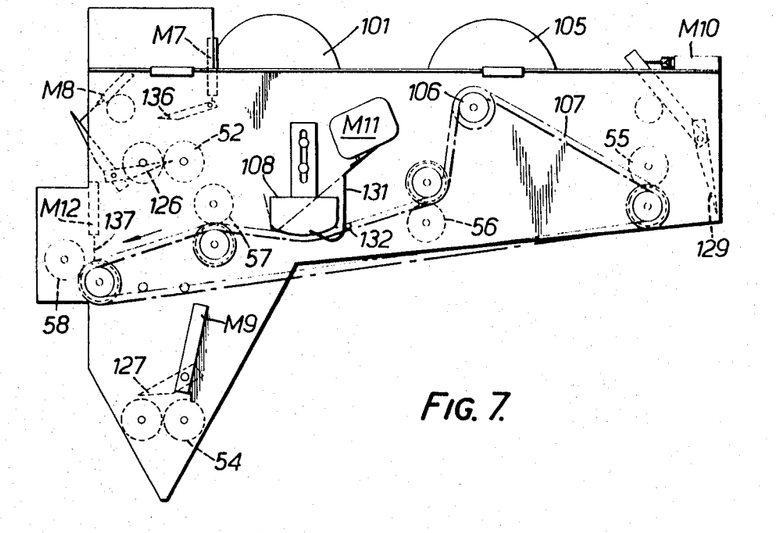
FIG. 7 is a side elevation of the infeed-outfeed unit and is similar to FIG. 6 but is taken from the opposite side.
Figure 9:
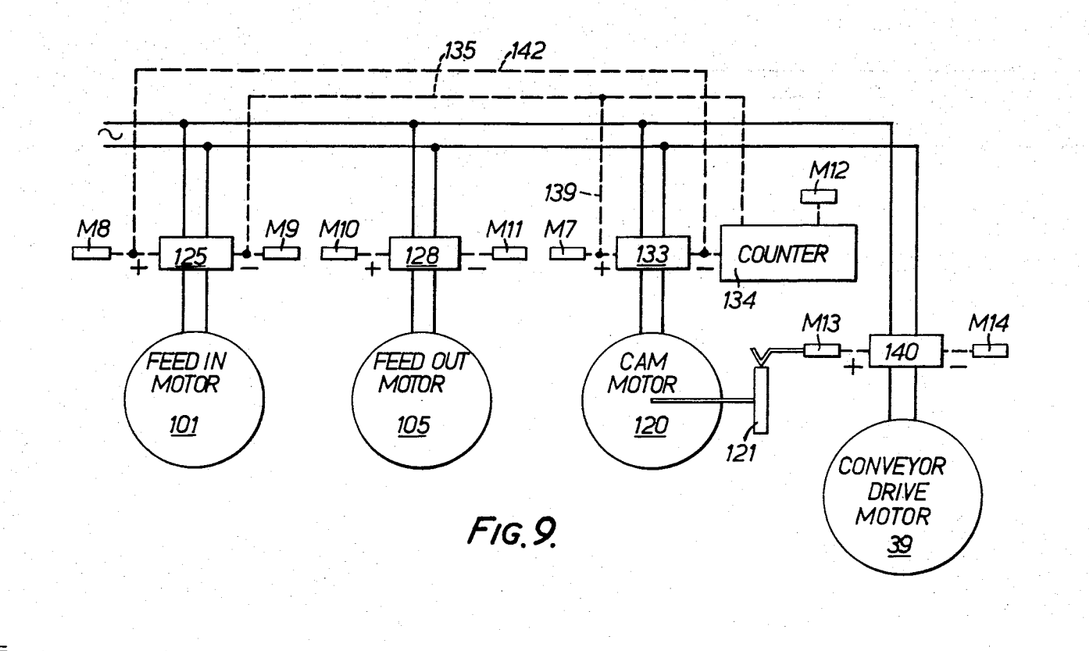
FIG. 9 is a block diagram showing the control system of the apparatus.

The feed-in motor 101 is controlled by switching means 125 shown in the block diagram of FIG. 9 and this in turn is controlled by two microswitches M8 and M9 shown in FIG. 7. The microswitch M8 is operated by a finger 126 which is positioned to be engaged by one of the studs 72 on the conveyor chain 33 and supporting one of the carriers 70 when such carrier is positioned with its lower sheet-carrying section immediately below the feed-out rollers 54 and is in a position to receive a sheet. The microswitch M9 has a finger 127 positioned to be engaged by paper passing through the feed-out rollers 54.

The feed-out motor 105 has a switching unit 128 (FIG. 9) which is under the control of two microswitches M10 and M11 shown in FIG. 7. The microswitch M10 is operated by a finger 129 positioned to be engaged by a sheet of paper approaching the feed-out rollers 55. The microswitch M11 has a finger 131 positioned to be engaged by a stud 132 on the feed-out drive chain 107.

The cam motor 120 is controlled by a switching unit 133 under the control of a microswitch M7 and a counter 134 which is supplied with signals along a line 135 from the microswitch M9 and with signals from a microswitch M12 adjacent the feed-out rollers 58. The microswitch M7 (FIG. 7) has a finger 136 located to be engaged by a piece of paper fed from the camera to the feed-in rollers 52. The microswitch M12 has a finger 137 positioned to be engaged by a finished photograph leaving the apparatus through the feed-out rollers 58. The switching unit 133 also receives signals directly from the microswitch M9 along a branch line 138 and from the microswitch M8 along a branch line 139.

The conveyor drive motor 39 is controlled by a switch unit 140 which in turn in controlled by the cam-operated microswitch M13 and a microswitch M14 (FIG. 4) which has a finger 141 positioned to be engaged by the studs 72 on the conveyor chain 33.

The sequence of operations is as follows. After a length of sensitised strip is exposed in the camera, the strip is fed down towards the feed-in rollers 52 past the finger 136 of the microswitch M7 and the exposed length is then cut off by a guillotine forming part of the camera apparatus, the microswitch M7 operates to cause the switching unit 133 to switch on the cam motor 120 which rotates the cam 121 to actuate the microswitch M13 to cause the switching unit 140 to start the conveyor drive motor 39. Accordingly, the chain 33 is moved and continues to move until one of the studs 72 engages the finger 126 of the microswitch M8 to indicate that a carrier is in position to receive the sheet. Actuation of the microswitch M8 causes a signal to be set along the line 142 to the switching unit 133 to stop the cam motor 120. Shortly thereafter one of the studs 72 engages the finger of the microswitch M14 to cause the switching unit 140 to stop the conveyor drive motor 39. Actuation of the microswitch M8 also causes the switching unit 125 to start the feed-in motor 101. The sheet is therefore fed through the feed-in rollers 52, 53 and 54 into the waiting carrier 70. When the sheet clears the finger 127 the microswitch M9 is actuated and causes the switching unit 125 to switch off the feed-in motor 101. Also via the signal line 135 it causes the switching unit 133 to start the cam motor 120 which shortly causes the microswitch M13 to start the conveyor drive motor 39. The conveyor drive motor causes the conveyor chain 33 to advance through $\frac{1}{16}$ of its length by which time a stud 72 will engage the finger 141 of the microswitch M14 which causes the switching unit 140 to stop the conveyor drive motor. At this time the carrier 70 will be in the position shown at the left hand side of FIG. 4 with the sheet dipped into the process liquid in the tank 41. There then ensues a dwell period of four seconds before the cam 121 which is rotating continuously at this time actuates the microswitch M13 to cause the switching unit 140 to start the conveyor drive motor 39 again. The conveyor chain 33 travels through another $\frac{1}{16}$ of its length until the next stud engages the finger 141 of the microswitch M14 and the motor 39 is switched off again. The carrier 70 has now been withdrawn from the left hand tank and is in a position to drain into the left hand tank in a position similar to that of the carrier 70a shown in FIG. 4. There is another dwell of four seconds. These operations are repeated with the conveyor chain 33 advancing step by step until the carrier has been dipped into each of the eight tanks 41 and has been allowed to drain above each tank. The carrier then advances along the upper pass 34 until it reaches a position in which the upper edge of the sheet engages the finger 129 of the microswitch M10. This causes the switching unit 128 to start the feed-out motor 105 so that the sheet is withdrawn from the carrier and passed through the feed-out rollers 55, 56, 57 and 58 to the waiting customer. The feed-out chain 107 travels through one complete revolution until the stud 132 engages the finger 131 of the microswitch M11 which causes the switching unit 128 to stop the feed-out motor Actuation of the microswitch M9 as a sheet was fed into a carrier caused a pulse to be delivered along the line 135 to the counter 134 which is able to store this pulse. As the sheet leaves the feed-out rollers 58 it causes the finger 137 to actuate the microswitch M12 which delivers a substracting pulse to the counter 134. Assuming that no further sheets have passed the microswitch M9 in the meantime, this substracting pulse is substracted from the pulse stored in the counter since the sheet passed the microswitch M9. This restores the counter to zero which results in a signal being transmitted to the switching unit 133 to switch off the cam motor 120. The next time the microswitch M14 is actuated to switch off the conveyor drive motor 39 this motor will not be switched on again and the apparatus will remain stationary until a further sheet is sensed by the microswitch M7. It will be understood that if one or more further sheets are fed past the microswitch M9 before the first sheet leaves the apparatus past the microswitch M12, the counter 134 will not be returned to zero to stop the apparatus until the last sheet has left the apparatus past the microswitch M12.

What I claim as my invention and desire to secure by Letters Patent is:

1. Photographic development apparatus including:
a carrier for an exposed photo-sensitive sheet;
a plurality of process tanks, each having a side wall;
conveyor means arranged to dip the carrier successively into said process tanks;
and guide means for said conveyor means so located that during transfer of said carrier from one of said process tanks to the next one of said process tanks, said carrier moves in a direction substantially parallel to said tank side wall whereby the end of said carrier is drawn over the edge of said one tank whereby surplus liquid is wiped from the bottom of said carrier.

2. Apparatus according to claim 1 in which said tanks are arranged side by side and each has a lip on the edge over which the carrier is drawn and which overlies the adjacent edge of the adjacent tank.

3. A method of developing an exposed photosensitive sheet, which comprises:
placing said sheet in a carrier suspended from a conveyor;
driving said conveyor to cause said sheet to be dipped into each of a plurality of process tanks containing developer liquids;
driving said conveyor to cause said carrier to be drawn from one process tank, moved substantially horizontally and dipped into the next process tank;
automatically wiping developer liquid from the bottom of said carrier as said carrier moves substantially horizontally; and
withdrawing the developed sheet from said carrier which after partial withdrawal from each said tank, dwells in contact with each said tank.

References Cited
UNITED STATES PATENTS

| | | | |
|---|---|---|---|
| 1,305,848 | 6/1919 | Weinheim | 118—70 |
| 2,104,868 | 1/1938 | Kraus | 118—121 |
| 2,380,378 | 7/1945 | Allen | 95—89 X |
| 2,786,736 | 3/1957 | Roughsedge | 95—94 X |
| 2,939,373 | 6/1960 | Weishaupt | 95—94 |
| 3,338,437 | 8/1967 | Davis et al. | 198—19 X |
| 3,343,472 | 9/1967 | Rosenberg | 95—94 |
| 3,469,517 | 9/1969 | Nishimoto | 95—89 X |

JOHN M. HORAN, Primary Examiner

A. MATHEWS, Assistant Examiner

U.S. Cl. X.R.

95—14, 94 R; 15—100; 134—75; 118—71